United States Patent
Da Silva Miranda et al.

(10) Patent No.: US 10,848,994 B1
(45) Date of Patent: Nov. 24, 2020

(54) USING A REMOTE PROXIMITY BRIDGE SERVICE FOR DEVICES THAT USE PROXIMITY COMMUNICATION PROTOCOLS

(71) Applicant: Amazon Technologies, Inc., Seattle, WA (US)

(72) Inventors: Mauricio Da Silva Miranda, Sammamish, WA (US); Tiangang Song, Seattle, WA (US); Calvin Yue-Ren Kuo, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 16/147,449

(22) Filed: Sep. 28, 2018

(51) Int. Cl.
*H04W 24/06* (2009.01)
*H04L 12/26* (2006.01)
*H04L 29/06* (2006.01)

(52) U.S. Cl.
CPC ............. *H04W 24/06* (2013.01); *H04L 43/06* (2013.01); *H04L 69/08* (2013.01)

(58) Field of Classification Search
CPC ......... H04W 24/06; H04L 43/06; H04L 69/08
See application file for complete search history.

(56) References Cited

U.S. PATENT DOCUMENTS

| | | | | |
|---|---|---|---|---|
| 10,715,640 B2 * | 7/2020 | Bikumala | ............... | H04L 12/66 |
| 2011/0047036 A1 * | 2/2011 | Foran-Owens | .... | G06Q 20/3823 |
| | | | | 705/17 |
| 2014/0146731 A1 * | 5/2014 | Hynell | .................... | H04W 4/80 |
| | | | | 370/311 |
| 2014/0157392 A1 * | 6/2014 | Smith | ..................... | H04L 63/18 |
| | | | | 726/9 |
| 2014/0357192 A1 * | 12/2014 | Azogui | ............. | H04W 52/0209 |
| | | | | 455/41.2 |
| 2015/0245224 A1 | 8/2015 | Ahuja | | |
| 2015/0257091 A1 | 9/2015 | Zur et al. | | |
| 2017/0054859 A1 * | 2/2017 | Zehler | ................... | G06F 3/1273 |
| 2017/0243020 A1 * | 8/2017 | Dhondse | ............... | H04L 63/102 |
| 2018/0053238 A1 * | 2/2018 | Astigarraga | ....... | G06Q 30/0631 |
| 2018/0098364 A1 * | 4/2018 | Meads | .................... | H04L 67/06 |
| 2020/0021669 A1 * | 1/2020 | Bikumala | ............... | H04L 69/08 |

* cited by examiner

*Primary Examiner* — Will W Lin
(74) *Attorney, Agent, or Firm* — Robert C. Kowert; Kowert, Hood, Munyon, Rankin & Goetzel, P.C.

(57) ABSTRACT

A remote proximity bridge service receives respective specifications that indicate a respective proximity communication protocol (e.g., Wi-Fi, serial port, etc.) to be used by devices of a client-specified network. The service may then select different test devices to be used for testing the client-specified network, such that the selected test devices are capable of using the proximity protocol. The test devices may also be configured based on the specifications. A test device may communicate with another test device using bridge devices. The test device transmits a signal to a first bridge device according to a proximity protocol. The first bridge device converts the signal into a network protocol message and transmits the message to a second bridge device. The second bridge device converts the message into a signal and transmits the signal to the other test device. Performance results of the test devices may be transmitted to a client network.

20 Claims, 9 Drawing Sheets

USING A REMOTE PROXIMITY BRIDGE SERVICE FOR DEVICES THAT USE PROXIMITY COMMUNICATION PROTOCOLS

BACKGROUND

Computer networks often include many different devices that communicate using a variety of communication protocols. Network devices sometimes communicate over long distances using a network protocol. However, many network devices use communication protocols that require physical proximity with another device in order to transmit data to the other device. For example, certain network devices may communicate using Bluetooth, serial ports, Wi-Fi, or other wireless protocols that require physical proximity.

When building a new network or adding new devices to an existing network, determining which devices work best in the network may be a time-consuming process. Testing out the functionality and compatibility of devices that use proximity communication protocols may present additional challenges. For example, the communication bandwidth of such devices may be affected by the relative positions of those devices in the network topology. Moreover, different software and hardware configurations of those devices may affect communication compatibility with other network devices.

Due to the variety of possible network topologies using devices with different proximity communication protocols, the process of testing multiple topologies across different devices can be expensive and somewhat unreliable. For example, wireless devices may cause varying amounts of interference with other wireless devices depending on the topology as well as the configuration of devices. Moreover, the amount of time to set up different network configurations may increase exponentially as additional devices are added.

Figure 1:
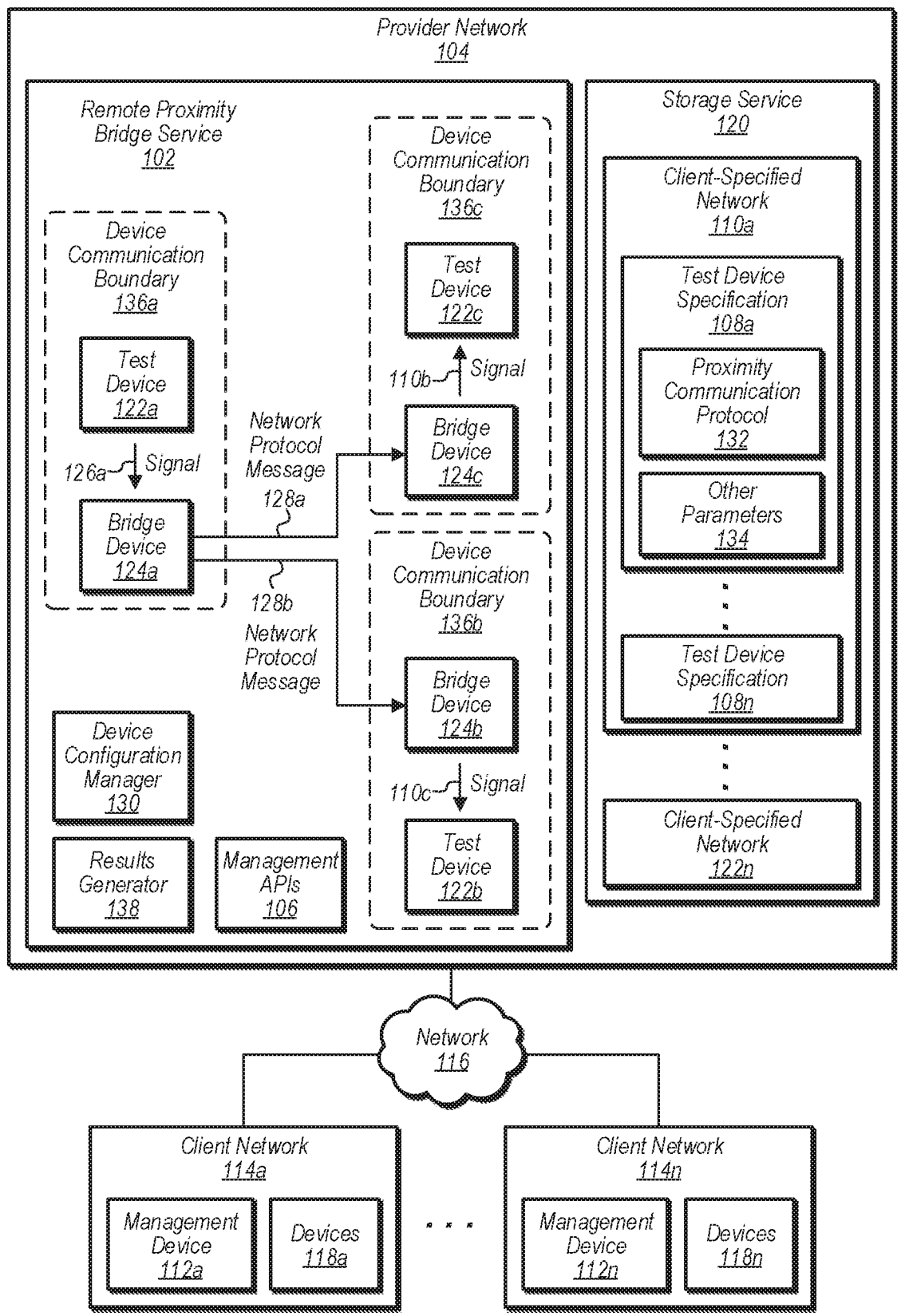
FIG. 1 illustrates a system for using a remote proximity bridge service to test devices that use proximity communication protocols, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for using a remote proximity bridge service for devices that use proximity communication protocols. Embodiments may allow a client to test various network configurations of devices that use (e.g., Wi-Fi, Bluetooth, serial port protocols, etc.) using devices of a provider network, without having to implement and configure the devices at their own client network. This may reduce the time required to acquire devices, configure the devices, and re-arrange the devices into different network configurations for testing purposes.

In some embodiments, a client may provide specifications for a network of devices to be tested by a remote proximity bridge service. The specification may include a proximity communication protocol (or "proximity protocol") to be used by at least some of the devices to be tested. The remote proximity bridge service may then select different test devices to be used based on the different device specifications provided by the client.

The device specifications may also indicate one or more other parameters for configuring a test device. For example, the specification for a test device may indicate an operating system to be installed. The remote proximity bridge service may then install the operating system onto the selected device.

In embodiments, the device specifications may indicate a type of hardware to be used by the test device (e.g., certain types of processors). In such embodiments, the remote proximity bridge service may select a device that matches the hardware, before it installs any operating system or software.

In various embodiments, any suitable security communication protocols may be used to protect data that is being sent between any devices and/or networks (e.g., provider network, client network, test devices, bridge devices, etc.). For example, data may be encrypted using SSL (secure socket layer), TLS (transport layer security), HTTPS (secure hypertext transfer protocol), and/or any other suitable network security protocol.

FIG. 1 illustrates a system for using a remote proximity bridge service to test devices that use proximity protocols, according to some embodiments. In the illustrative embodiment, the remote proximity bridge service 102 of a provider network 104 includes one or more management APIs 106 that receive a one or more test device specifications 108 for a client-specified network 110 from a client.

In embodiments, a user may provide the test device specifications 108 to a management device 112 of a client network 114. The management device 112 may then transmit the device specifications 108 to the management APIs 106 of the bridge service 102 via a wide-area network 116 (e.g., the internet). Thus, the provider network 102 may be considered a remote provider network and may be in another physical location than the management device 112 or other devices 118 of the client network 112, such as another city, state, or country. In embodiments, the bridge service 100 may also receive test device specifications 108 for one or more other client-specified networks 110 from management devices 112 of any number of other client networks 114.

As shown, the test device specifications 108 are stored at a storage service 120 of the provider network 104. However, in embodiments, any other location of the provider network 104 or external to the provider network 104 may be used to store the test device specifications 108. In embodiments, at least some or all of the device specifications 108 for a client-specified network 110 may be received from one or more locations at the provider network 104 or one or more other remote networks.

Figure 2:
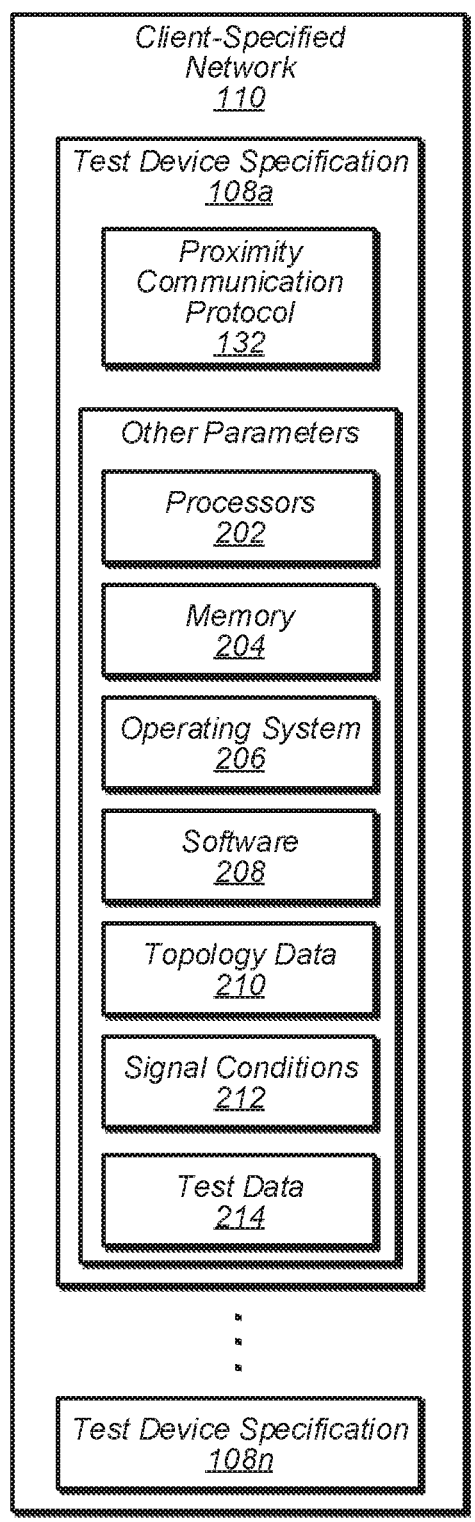
FIG. 2 is a block diagram of a test device specification for a device that uses a proximity communication protocol, according to some embodiments.
Figure 3:
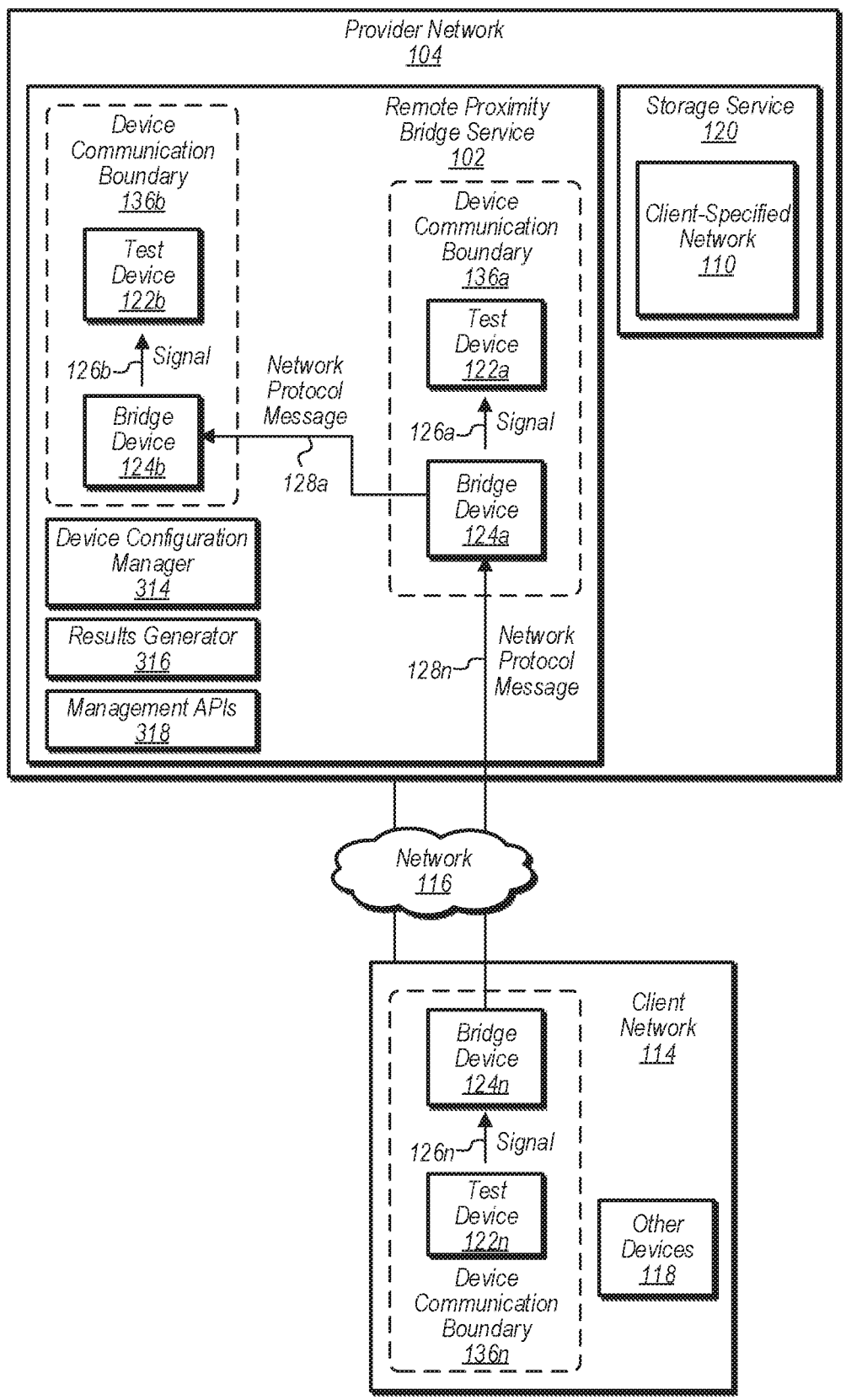
FIG. 3 illustrates a system for using a remote proximity bridge service to receive a network protocol message from a bridge device of a remote client network and to test devices that use proximity communication protocols at a provider network, according to some embodiments.
Figure 4:
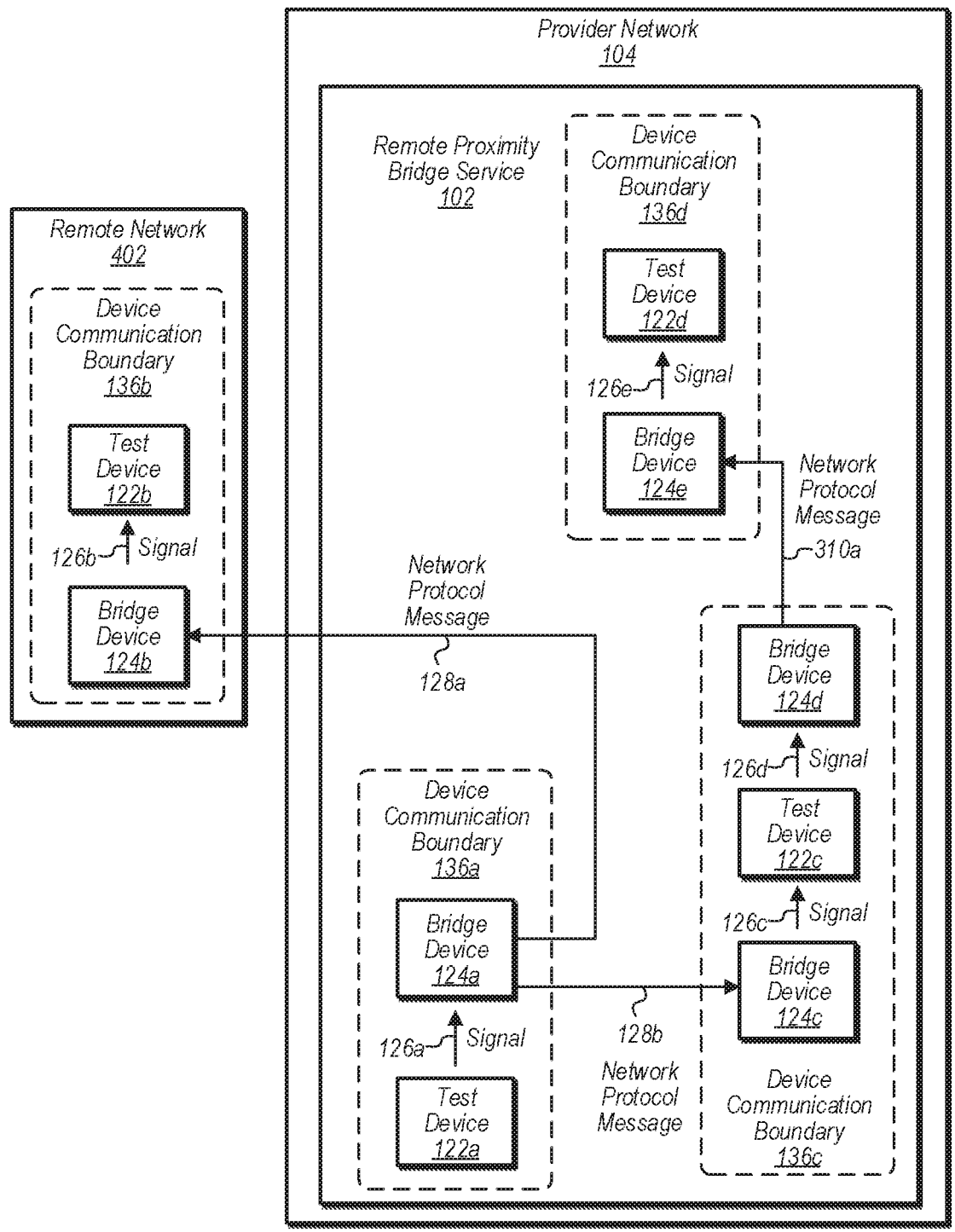
FIG. 4 illustrates a system for using a remote proximity bridge service to test devices that use proximity communication protocols at a provider network and a remote network, according to some embodiments.

In embodiments, the provider network 104, client network 114, remote proximity bridge service 102, storage service 120, and any other components depicted in FIG. 1 may be the same as or include one or more of the same components as the provider network, client network, remote proximity bridge service, storage service, and any other components depicted in any of FIGS. 2-4, in embodiments. In embodiments, the provider network, client network, remote proximity bridge service, storage service, and any other components depicted in any one of FIGS. 1-4 may be the same component as (e.g., same type of component) or include one or more of the same components as a provider network, client network, remote proximity bridge service, storage service, and any other components depicted in any other one of FIGS. 1-4.

In the depicted embodiment, the bridge service 102 may contain any number of test devices 122 and any number of bridge devices 124. In embodiments, each of the test devices 122 and/or bridge devices 124 is configured to communicate using one or more proximity protocols. In some embodiments, for a given proximity protocol, two devices separated beyond a threshold distance are unable to communicate using the given proximity protocol. Therefore, wireless communication protocols (e.g., Wi-Fi, Bluetooth, longer range sub-GHz, etc.) and serial port protocols (e.g., universal serial bus (USB)) are examples of proximity protocols. However, any other communication protocol that operates within a threshold distance as described above may be considered a proximity protocol (e.g., any internet protocol or other protocol for transmitting data from one device to another via air or wire).

As discussed below, one or more (or all) of the test devices 122 and/or bridge devices 124 of a client-specified network may use transceivers to communicate using one or more proximity communication protocols. Therefore, the test devices may receive signals from a bridge device and/or transmit signals to a bridge device. Furthermore, as discussed below, two or more different bridge devices that each use one or more proximity protocols may be used in conjunction with a test device (e.g., within a device communication boundary).

In embodiments, one or more (or all) of the test devices 122 may be configured to communicate using multiple different proximity protocols. For example, a particular test device 122 and/or bridge device 124 may be capable of communicating using Wi-Fi, Bluetooth, or cellular signals using one or more corresponding transceivers. In embodiments, a test device and/or bridge device may use software-defined radio in order to communicate using one or more different proximity protocols. This above techniques may allow the provider network to conserve resources by using a smaller number of configurable bridge devices and test devices to test out different proximity protocols and potential network configurations. For example, a test device or bridge device may re-configure itself from using Wi-Fi to using Bluetooth to match a proximity protocol indicated in a device specification.

As discussed below, each of the bridge devices 124 may be configured to convert one or more proximity protocol signals into one or more network protocol messages (e.g., transmission control protocol/internet protocol (TCP/IP) messages) and/or may be configured to convert one or more network protocol messages into one or more proximity protocol signals. For example, the bridge device 124a may receive the signal 126a that is transmitted from the test device 122a according to a proximity communication protocol (e.g., Wi-Fi). The bridge device 124a may convert the signal into one or more network protocol messages 128 and transmit the one or more network protocol messages 128 to one or more other bridge devices.

In the illustrated embodiment, a device configuration manager 130 may select and/or configure a different test device 122 according to each of the test device specifications 108 included in the client-specified network 110. For example, each of the test devices 122a-122c may be selected because they are each configured to communicate using a proximity protocol 132 indicated in a corresponding test device specification 108 (e.g., Wi-Fi).

In embodiments, the device configuration manager 130 may also configure each of the test devices 122 according to one or more other parameters 134 indicated in a corresponding test device specification 108. For example, after the test device 122a is selected based on the proximity protocol indicated in the test device specification 108a, the device configuration manager 130 may install a particular operating system (OS) and/or particular software on the test device 122a because the particular operating system (OS) and/or particular software is indicated in the test device specification 108a.

As shown, each of the bridge devices 124 is within a threshold distance of a corresponding test device 122 such that the test device 122 is able to communicate with the bridge device by transmitting a signal 126 to the bridge device (or vice-versa) according to the proximity communication protocol 132 indicated in the corresponding test device specification for the test device. Therefore, each of the bridge devices 124 may communicate with a corresponding test device 122 using a corresponding proximity communication protocol.

In embodiments, one or more of the pairs of test devices and bridge devices may be enclosed within a device communication boundary 136. For example, the test device 122a and the bridge device 124a may be enclosed within the communication boundary 136a. In embodiments, a communication boundary may be any physical boundary that prevents the test device and/or the edge device from interfering with other wireless devices outside of the enclosure. Thus, a communication boundary may be a Faraday cage or any other type of boundary suitable to prevent interference by eliminating or attenuating a wireless signal.

In some embodiments, the device communication boundary may represent the threshold distance within which the test device is able to communicate using the proximity protocol. Therefore, the test device is unable to communicate with other devices outside of the device communication boundary using the proximity protocol due to the other devices being outside of the range of the proximity protocol used by the test device.

In various embodiments, one or more of the test devices 122 are tested in order to determine how (or whether) the test devices of the client-specified network operate. For example, test data (e.g., device commands, data to be transmitted, test plan, etc.) may be provided to the test devices 122 to cause the test devices to transmit and/or receive signals to or from other test devices 122 using the bridge devices.

In embodiments, the test data may be provided as part of the test device specification for the devices and/or may be provided separately by a client using the management APIs 106. For example, after test devices are configured according to the test device specifications 108 for a client-specified network, a user may provide test data via the management device 112, which transmits the test data to the management APIs 106. The bridge service 102 may then use the test data to test the test the performance of the test devices (e.g., transmission performance). In embodiments, the results generator 138 collects performance data of the test devices (e.g., transmission performance metrics), generates results based on the collected data, and transmits the results to an endpoint (e.g., a client network).

In embodiments, the results generator 138 may use various test hardware and associated protocols to obtain performance data from the test devices. For example, a joint test action group (JTAG) hardware interface/protocol may be used to perform boundary scanning and to test/verify circuit and test device logic for processors and other hardware used by the test devices. In embodiments, universal asynchronous receiver transmitter (UART) hardware may be used to send and receive test data from the test devices.

In the illustrated embodiment, each of the test devices may transmit signals to corresponding bridge device and/or receive signals from a corresponding bridge device (e.g., to test the operation/performance of the test devices. For example, test data may be provided to the test device 122a (e.g., commands and/or data to be transmitted). Based on the test data, the test device 122a generates a signal and transmits the signal to the corresponding bridge device 124a according to the proximity protocol used by the test device 122a.

In embodiments, the bridge device 124a may convert the received signal into one or more network protocol messages 128. The bridge device 124a may then transmit the one or more network protocol messages to one or more other bridge devices. In the example embodiment, the bridge device actually transmits the one or more network protocol messages to two different bridge devices 124b and 124c.

The bridge device 124b converts the one or more network protocol messages into another signal 126b. The bridge device 124b then transmits the signal 126b to the test device 122b according to the proximity protocol. In some embodiments, the test device 122b may send a return signal to the test device 122a using the same bridge devices in the same or similar manner (e.g., transmitting a return signal to the bridge device 122b, which converts the return signal to one or more network protocol messages, converting the messages back into a signal at the bridge device 122a, transmitting the signal to the test device 122a). In embodiments, the test device 122c may communicate with the test device 122a in the same or similar manner as described above.

In some embodiments, a bridge device may generate an emulated signal instead of receiving a signal from an actual test device. For example, a bridge device may generate an emulated signal according to a proximity protocol (e.g., Wi-Fi or Bluetooth, or any protocol for transmitting data via air or wire), convert the emulated signal into one or more network protocol messages, and transmit the one or more network protocol messages to another bridge device.

Although the example embodiment depicts one test device communicating with two other test devices using corresponding bridge devices, in other embodiments any number of test devices may be used. Moreover, in various embodiments, any type of network topology may be created and tested by the bridge service 102 using any number of test devices. This may allow a client to test out many different network configurations and/or many different types of devices without having to purchase devices, configure the devices, and test the devices at the client side. This may conserve computing resources of the client, reduce testing errors, and save a considerable amount of time.

FIG. 2 is a block diagram of a test device specification for a device that uses a proximity communication protocol, according to some embodiments. In the depicted embodiment, the test device specification 108a for a test device includes the proximity protocol 132.

As shown the test device specification 108a includes several other parameters that may be used by the remote proximity bridge service 102 to configure a test device. The illustrated parameters include one or more processors 202 (e.g., processor types, brands, architectures, speed, etc.). The parameters also include memory 204 (e.g., memory types, brands, architectures, size, speed, etc.). The parameters also include an operating system 206 (e.g., operating system types, versions, etc.).

The parameters also include software 208 (e.g., one or more applications, test applications, etc.). As shown, the parameters may also include topology data 210. In embodiments, the topology data may include any type of data that indicates a location of the test devices with respect to each other (e.g., physical location and/or logical location).

For example, the topology data may indicate a distance the test device is separated from another test device (e.g., to receive a signal from and/or transmit a signal to). In some embodiments, the bridge service may select a test device that is located a particular distance away from the corresponding bridge device in order to match or approximately match the distance of separation indicated in the topology data. In embodiments, one or more physical objects may be located at one or more locations relative to the bridge device and the test device (e.g., in between or adjacent to) in order to simulate the physical setup of a client-side network, including any physical structures.

In embodiments, the parameters may indicate signal conditions 212 for the signals to be received by the test device and/or transmitted by the test device according to the proximity communication protocol. For example, the signal conditions 212 may indicate one or more levels of signal strength to be used for the signals (e.g., Wi-Fi or Bluetooth signal strength). In some embodiments, the signal conditions 212 may indicate one or more levels of noise or interference that affect the signal. In some embodiments, the bridge device and/or one or more additional bridge devices/other devices may generate one or more additional signals within a device communication boundary 136 in order to simulate potential noise or interference at the client site (e.g., at a client factory or plant that includes many different devices using wireless communication).

The parameters may also indicate test data 214 (e.g., data to be transmitted during testing, test plans, etc.). In embodiments, the other parameters may indicate any other number and/or type of resources (e.g. hardware and/or software) to be included in the selected test device (e.g., already installed on the test device) or to be installed in a test device after it is selected.

In embodiments, the bridge service 102 may use any of the above data provided in a test device specification for a test device 122 to configure (or re-configure) a bridge device to communicate with the test device and to test the operation of the test device as part of testing the client-specified network. In embodiments, after a test device is selected to be configured according to a particular test device specification 108, one or more corresponding bridge devices (e.g., located within the device communication boundary 136 of the test device) are configured according to according to one or more of the parameters of the test device specification. For example, the one or more bridge devices may be configured to communicate using the specified proximity communication protocol 132 (e.g., using software-defined radio), configured to use the specified operating system 206 and/or software 208, configured to use some or all of the test data 214, and/or configured to transmit signals according to one or more of the signal conditions 212 (e.g., signal strength, noise).

FIG. 3 illustrates a system for using a remote proximity bridge service to receive a network protocol message from a bridge device of a remote client network and to test devices that use proximity communication protocols at a provider network, according to some embodiments.

In the depicted embodiment, a remote client network 114 includes a bridge device 124n that receives a signal from a test device 122n according to a proximity protocol (e.g., Wi-Fi or serial port). As shown, the bridge device 124n converts the received signal into one or more network protocol messages 128n and transmits them to a bridge device 124a at the remote proximity bridge service 102. As discussed above, the device communication boundary 136n may be a Faraday cage or any other type of boundary suitable to prevent interference. This may allow a client to use the remote proximity bridge service 102 to test out wireless devices without interfering with other wireless devices at the client network 114.

The bridge device 124a converts the one or more network protocol messages 128n into a signal 126a and transmits the signal to the test device 122a according to the proximity protocol. In the example embodiment, the bridge device 124a also forwards the one or more network protocol messages 128n to another bridge device 124b, which also converts the one or more network protocol messages 128n into a signal 126b. The signal 126b is then transmitted to the test device 122b. Thus, in various embodiments, a bridge device may also forward one or more network protocol messages to any number of other bridge devices.

As discussed above, in some embodiments, a bridge device (e.g., the bridge device 124n of the client network or the bridge device 124 of the provider network) may generate an emulated signal instead of receiving a signal from an actual test device. For example, the bridge device 124a may generate an emulated signal according to a proximity protocol (e.g., Wi-Fi or Bluetooth, or any protocol for transmitting data via air or wire), convert the emulated signal into one or more network protocol messages, and transmit the one or more network protocol messages to another bridge device (e.g., to the bridge device 124n of the remote client network or to the bridge device 124b of the provider network).

As shown in the example embodiment, a client may test a local device on their own network that use a proximity protocol with another test device that uses the proximity protocol at a remote provider network, even though the local device and the test device of the remote provider network are unable to communicate directly communicate using the proximity protocol. This may allow a client to test various network configurations and combinations of different devices without acquiring and/or configuration additional test devices.

In embodiments, a client may test any number of local devices with any number of remote test devices in the same or similar manner. For example, in various embodiments, one or more bridge devices at the client network may communicate with one or more other bridge devices at the provider network. This may provide flexibility to the client so that different types of network configurations and topologies may be tested using one or more local devices and one or more remote test devices.

FIG. 4 illustrates a system for using a remote proximity bridge service to test devices that use proximity communication protocols at a provider network and a remote network, according to some embodiments.

In the depicted embodiment, a bridge device 124a receives a signal 126a from the test device 122a in accordance with a proximity protocol. The bridge device converts the signal into one or more network protocol messages 128. As shown, the bridge device, sends the one or more network protocol messages 128a to a bridge device 124b of a remote network 402. The remote bridge device 124b converts the messages into a signal 126b and transmits the signal to the test device 122c in accordance with the proximity protocol.

In embodiments, the remote network 402 may be a remote datacenter that has one or more bridge devices and/or test devices used by the remote proximity bridge service. This may allow the provider network to use different types of test devices at the remote network 402 that may not be available at the provider network.

As shown, the bridge device also sends the one or more protocol network messages 128b to another bridge device 124c. The bridge device 124c converts the messages into a signal 126c and transmits the signal to the test device 122c in accordance with a proximity protocol (e.g., Wi-Fi). In the example embodiment, the test device 122c then transmits another signal 126d to another bridge device 124d in accordance with a different proximity protocol (e.g., Bluetooth). This may be useful, for example, for a client to test out low-energy Bluetooth signals transmitted from a wearable device or other moveable device to a nearby Wi-Fi capable device, which in turn may transmit a Wi-Fi signal to another network (e.g., to a remote provider network).

In the depicted embodiment, the bridge device 124d transmits one or more protocol network messages 128c to another bridge device 124e. The bridge device 124e converts the messages into a signal 126e and transmits the signal to the test device 122d in accordance with a proximity protocol.

As shown, a test device may be used in conjunction with two different bridge devices that use two different types of proximity protocols. This may avoid interference when wireless protocols are used with different transmission frequencies. In some embodiments, the same wireless protocol may be used, but at different times in order to avoid interference. In some embodiments, a wireless protocol may be used for one bridge device and a serial port protocol for another bridge device.

Figure 5:
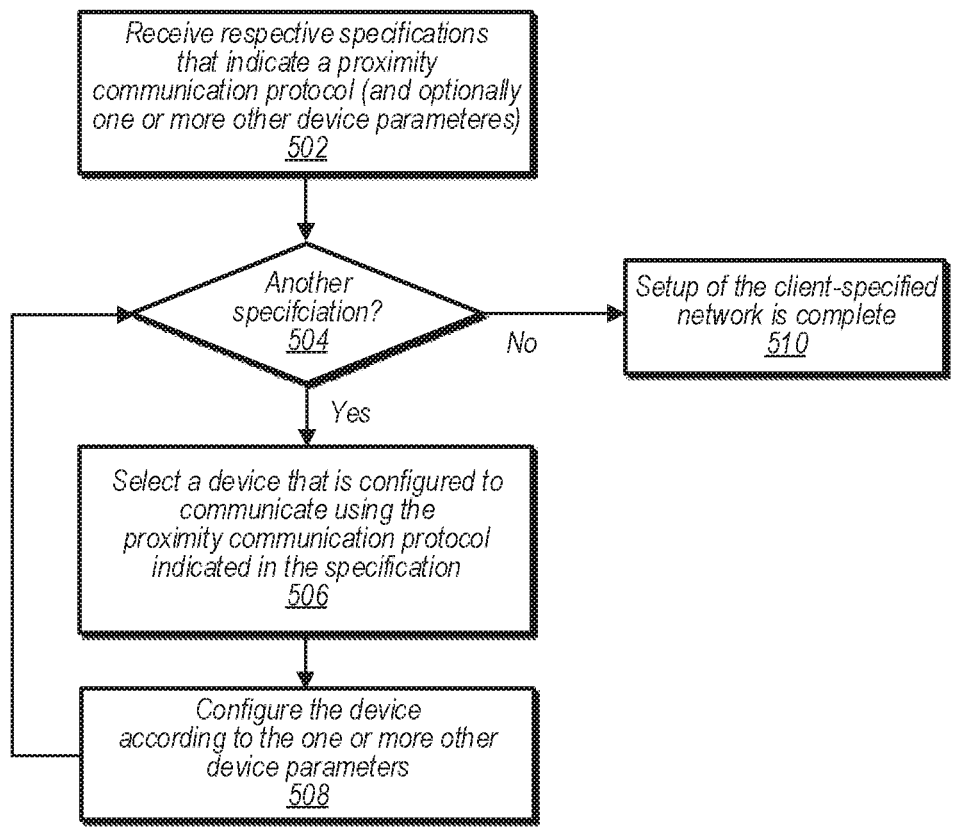
FIG. 5 is a flow diagram that illustrates configuring test devices at a remote proximity bridge service according to specifications, according to some embodiments.

FIG. 5 is a flow diagram that illustrates configuring test devices at a remote proximity bridge service according to specifications, according to some embodiments. At block 502, a remote proximity bridge service receives respective specifications that indicate a proximity communication protocol. In some embodiments, one or more of the respective specifications may also indicate one or more additional device parameters, as discussed above.

At block 504, the remote proximity bridge service (e.g., the device configuration manager) determines if there is another respective specification to process. If so, then at block 506, the remote proximity bridge service selects a device (e.g., a test device) that is configured to communicate using the proximity communication protocol indicated in the specification. Note that in various embodiments, the test devices 122 may be used for purposes other than simply testing or verification. For example, the test devices 122 of a client-specified network may actually be used as part of a production system (e.g., after the test devices have been tested and/or verified) by the client, in order to provide a service for their own clients/customers based on results received from operation of the client-specified network.

At block 508, if the remote proximity bridge service configures the selected device according to the one or more other device parameters. At block 504, if the remote proximity bridge service determines that there are no more respective specification to process, then at block 510, the remote proximity bridge service determines that the setup of the client-specified network is complete. In some embodiments, the remote proximity bridge service may send an indication to the client network that the setup is complete.

Figure 6:
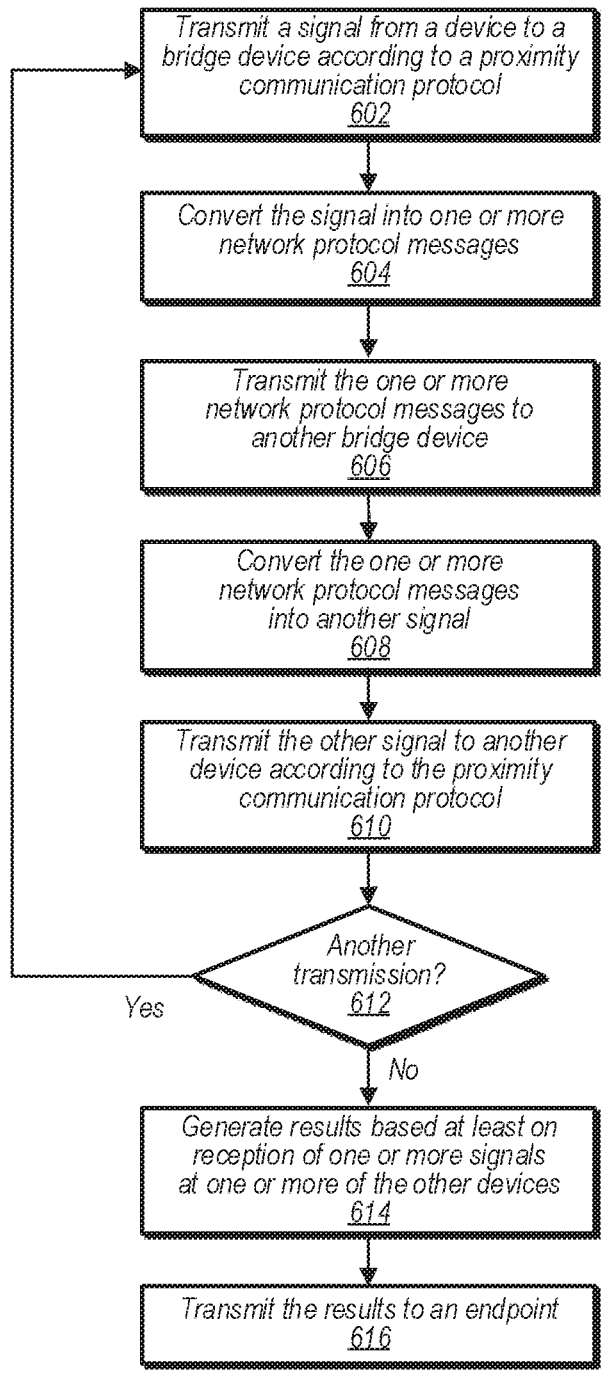
FIG. 6 is a flow diagram that illustrates using a remote proximity bridge service to transmit signals from one test device to another test device using bridge devices, according to some embodiments.

FIG. 6 is a flow diagram that illustrates using a remote proximity bridge service to transmit signals from one test device to another test device using bridge devices, according to some embodiments. At block 602, a device (e.g., a test device 122) transmits a signal to a bridge device according to a proximity protocol. At block 604, the bridge device converts the signal into one or more network protocol messages. At block 606, the bridge device transmits the one or more network protocol messages to another bridge device. At block 608, the other bridge device converts the one or more network protocol messages into another signal.

At block 610, the other bridge device transmits the other signal to another device (e.g., another test device 122) according to a proximity protocol. At block 612, if there is another transmission between devices (e.g., test devices 122) of the client-specified network, then at block 602, the other transmission begins.

At block 612, if there are no more transmissions between the devices (e.g., if the test round is complete), then at block 614, the remote proximity bridge service generates results based at least on reception of one or more signals at one or more of the other test devices.

In embodiments, the results may be based on one or more of any of the signal transmissions to and from any of the devices (e.g., test devices 122) and/or bridge devices (e.g., rate of transmission, bandwidth, amount of lost data, transmission failures, etc.). At block 616, the remote proximity bridge service may then transmit the results to an endpoint (e.g., a remote client network).

Figure 7:
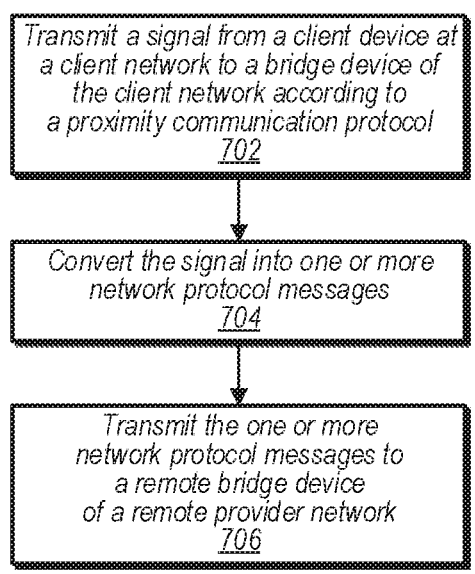
FIG. 7 is a flow diagram that illustrates converting a signal into network protocol messages at a client network and transmitting the messages to a remote bridge device of a remote provider network, according to some embodiments.

FIG. 7 is a flow diagram that illustrates converting a signal into network protocol messages at a client network and transmitting the messages to a remote bridge device of a remote provider network, according to some embodiments.

At block 702 a client device (e.g., a test client device) at a client network transmits a signal to a bridge device at the client network according to a proximity protocol. At block 704, the bridge device converts the received signal to one or more network protocol messages. At block 706, the bridge device transmits the one or more network protocol messages to a remote bridge device of a remote provider network. In some embodiments, the client network may receive a return signal from the remote bridge device and/or results from the provider network, as discussed above.

Figure 8:
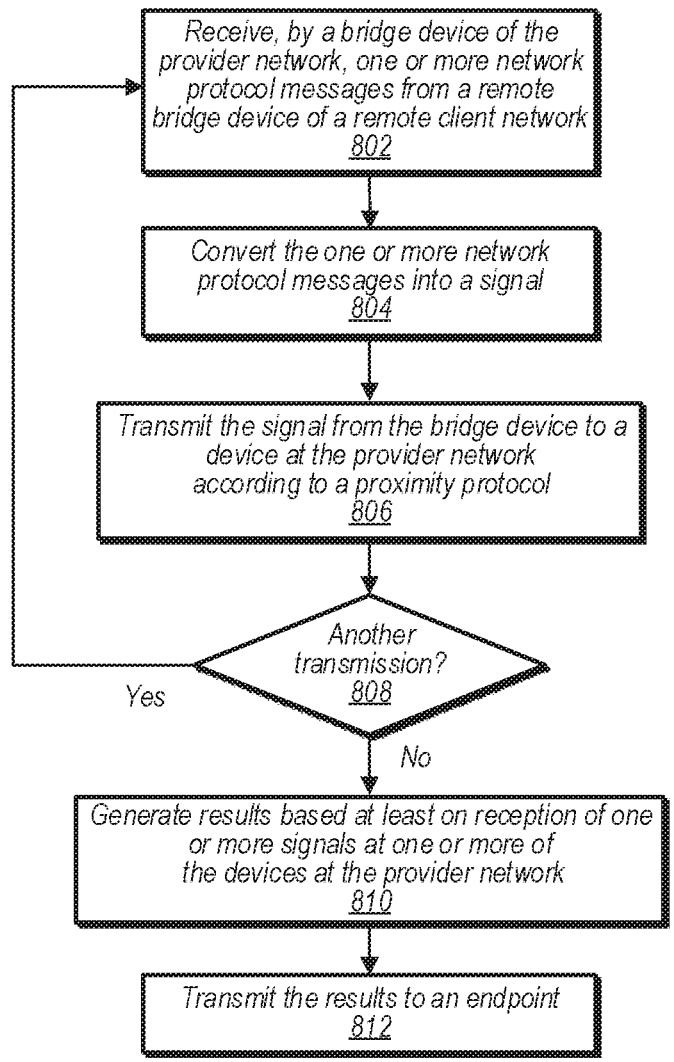
FIG. 8 is a flow diagram that illustrates receiving network protocol messages from a remote client network, converting the messages into a signal at a provider network, and transmitting the signal to a test device, according to some embodiments.

FIG. 8 is a flow diagram that illustrates receiving network protocol messages from a remote client network, converting the messages into a signal at a provider network, and transmitting the signal to a test device, according to some embodiments.

At block 802, a bridge device of the provider network receives one or more network protocol messages from a remote bridge device of a remote client network. At block 804, the bridge device converts the one or more network protocol messages into a signal.

At block 806, the bridge device transmits the signal to a device (e.g., a test device 122) of the provider network according to a proximity protocol. At block 808, if there is another transmission from the remote bridge device, then at block 802, the bridge device begins processing the next transmission.

At block 808, if there are no more transmissions from the remote bridge device, then at block 810, the remote proximity bridge service generates results based at least on reception of one or more signals at one or more devices (e.g., test devices 122) of the provider network.

In embodiments, the results may be based on one or more of any of the signal transmissions to and from any of the devices (e.g., test devices 122) and/or bridge devices (e.g., rate of data transmission, bandwidth, amount of lost data, transmission failures, etc.). At block 812, the remote proximity bridge service may then transmit the results to an endpoint (e.g., a remote client network).

Any of various computer systems may be configured to implement processes associated with the provider network, client network, remote proximity bridge service, storage service, test devices, bridge devices, management devices, device configuration manager, results generator, management APIs, or any other component of the above figures. For example, FIG. 9 is a block diagram illustrating an example computer system that implements some or all of the techniques described herein, according to some embodiments.

Figure 9:
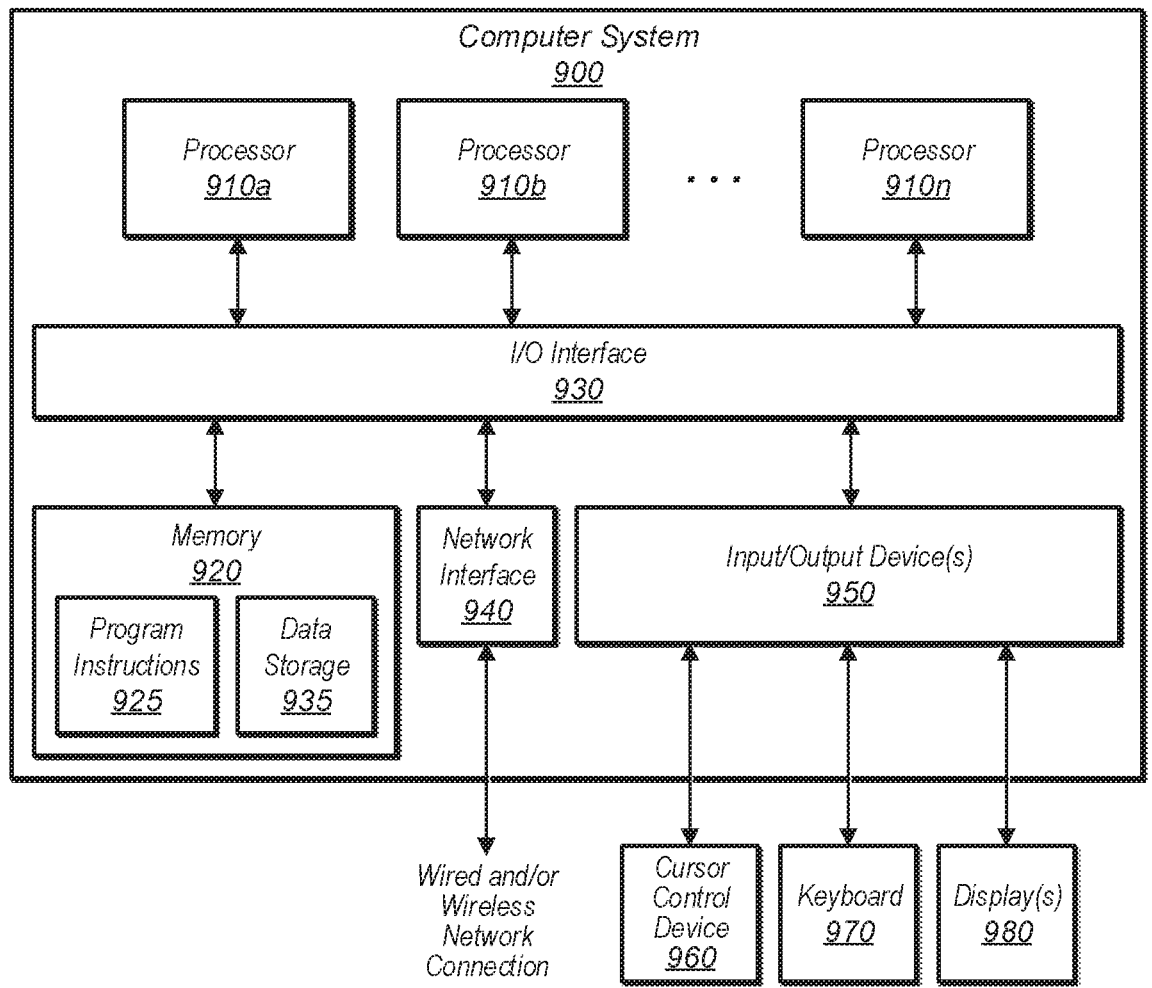
FIG. 9 is a block diagram illustrating an example computer system that implements some or all of the techniques described herein, according to some embodiments.

In various embodiments, the provider network, client network, remote proximity bridge service, storage service, test devices, bridge devices, management devices, device configuration manager, results generator, management APIs, or any other component of any of FIGS. 1-8 may each include one or more computer systems 900 such as that illustrated in FIG. 9. In embodiments, the provider network, client network, remote proximity bridge service, storage service, test devices, bridge devices, management devices, device configuration manager, results generator, management APIs, or any other component may include one or more components of the computer system 900 that function in a same or similar way as described for the computer system 900.

In the illustrated embodiment, computer system 900 includes one or more processors 910 coupled to a system memory 920 via an input/output (I/O) interface 930. Computer system 900 further includes a network interface 940 coupled to I/O interface 930. In some embodiments, computer system 900 may be illustrative of servers implementing enterprise logic or downloadable application, while in other embodiments servers may include more, fewer, or different elements than computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be embedded processors implementing any of a variety of instruction set architectures (ISAs), such as the x106, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 920 as program instructions 925. In some embodiments, system memory 920 may include data 935 which may be configured as described herein.

In one embodiment, I/O interface 1930 may be configured to coordinate I/O traffic between processor 910, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into processor 910.

Network interface 1940 may be configured to allow data to be exchanged between computer system 900 and other computer systems 900 or devices attached to a network, such as the local network discussed above, a wide-area network, or a local network within the provider network, for example. In particular, network interface 940 may be configured to allow communication between computer system 900 and/or various I/O devices 950. I/O devices 950 may include scanning devices, display devices, input devices and/or other communication devices, as described herein. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 900 via I/O interface 930. A computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In some embodiments, I/O devices 950 may be relatively simple or "thin" client devices. For example, I/O devices 950 may be configured as dumb terminals with display, data entry and communications capabilities, but otherwise little computational functionality. However, in some embodiments, I/O devices 950 may be computer systems configured similarly to computer system 900, including one or more processors 910 and various other devices (though in some embodiments, a computer system 900 implementing an I/O device 950 may have somewhat different devices, or different classes of devices).

In various embodiments, I/O devices 950 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 950 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 900. In general, an I/O device 950 (e.g., cursor control device 960, keyboard 970, or display(s) 980 may be any device that can communicate with elements of computing system 900.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
a plurality of test devices comprising respective processors and memory and configured to communicate using one or more proximity protocols, wherein for a given proximity protocol, two devices separated beyond a threshold distance are unable to communicate using the given proximity protocol;
a plurality of bridge devices comprising respective processors and memory and configured to perform one or more of:
convert proximity protocol signals into network protocol messages, or
convert network protocol messages into proximity protocol signals; and
one or more computing devices of a provider network comprising respective processors and memory to implement a remote proximity bridge service to:
receive respective specifications that indicate at least a respective proximity protocol;
select respective test devices of the plurality of test devices that are configured to communicate using the respective proximity protocols indicated by the respective specifications,
wherein for individual ones of the respective test devices to communicate with other individual ones of the respective test devices using a respective proximity protocol:
the test device is configured to transmit a signal to one of the bridge devices according to the proximity protocol;
the bridge device is configured to convert the signal into one or more network protocol messages and transmit the one or more network protocol messages to another of the bridge devices; and
the other bridge device is configured to convert the one or more network protocol messages into another signal and transmit the other signal to the other test device according to the proximity protocol, wherein the test device and the other test device are unable to directly communicate using the proximity protocol;
generate results based at least on reception of one or more of the other signals at one or more of the other test devices; and
transmit the results to an endpoint.

2. The system as recited in claim 1, wherein the respective configurations indicate one or more of software or an operating system to be installed, and wherein the one or more computing devices implement the remote proximity bridge service to:
install on the respective test devices one or more of the software or the operating system indicated by the respective specifications.

3. The system as recited in claim 1, wherein at least one of the respective test devices is configured to:
receive an additional one or more network protocol messages from a remote client network;
convert the additional one or more network protocol messages into an additional signal; and
transmit the additional signal to an additional one of the respective test devices according to a particular proximity protocol.

4. The system as recited in claim 1, wherein the plurality of test devices and the plurality of bridge devices are configured to communicate using one or more of a wireless protocol or a serial port protocol, and wherein the results are based at least on performance metrics for the reception of one or more of the other signals at one or more of the other test devices.

5. A method, comprising:
performing, by one or more computing devices of a provider network:
receiving respective specifications that indicate at least a respective proximity protocol;
selecting respective test devices of a plurality of test devices that are configured to communicate using the respective proximity protocols indicated by the respective specifications;
for individual ones of the respective test devices that are configured to communicate using one of the respective proximity protocols:
transmitting a signal from the test device to one of a plurality of bridge devices according to the proximity protocol;
converting, by the bridge device, the signal into one or more network protocol messages;
transmitting the one or more network protocol messages from the bridge device to another of the plurality of bridge devices;
converting, by the other bridge device, the one or more network protocol messages into another signal; and
transmitting the other signal from the other bridge device to another of the test devices according to the proximity protocol, wherein the test device and the other test device are unable to directly communicate using the proximity protocol;
generating results based at least on reception of one or more of the other signals at one or more of the other test devices; and
transmitting the results to an endpoint.

6. The method as recited in claim 5, wherein the respective specifications indicate software to be installed, and further comprising:
installing on the respective test devices the software indicated by the respective specifications.

7. The method as recited in claim 5, wherein the respective specifications indicate one or more hardware components, and wherein selecting respective test devices comprises:

selecting respective test devices of the plurality of test devices that comprise the one or more hardware components indicated by the respective specifications.

8. The method as recited in claim 5, further comprising:
configuring respective ones of the bridge devices to communicate using the respective proximity protocols indicated by the respective specifications.

9. The method as recited in claim 5, further comprising:
receiving, by at least one of the respective test devices, an additional one or more network protocol messages from a remote client network;
converting, by the at least one of the respective test devices, the additional one or more network protocol messages into an additional signal; and
transmitting, by the at least one of the respective test devices, the additional signal to an additional one of the respective test devices according to a particular proximity protocol.

10. The method as recited in claim 5, wherein the respective specifications indicate test data, and wherein transmitting a signal from the test device to one of a plurality of bridge devices comprises:
converting at least a portion of the test data into the signal.

11. The method as recited in claim 5, wherein the proximity protocol comprises a wireless communication protocol, and wherein an enclosure surrounds the test device to prevent the test device from interfering with other wireless devices outside of the enclosure.

12. The method as recited in claim 5, wherein the respective specifications indicate a respective wireless signal strength, and wherein the transmitting the other signal from the bridge device to another of the test devices comprises:
transmitting the other signal from the bridge device to the other test device according to the respective wireless signal strength.

13. The method as recited in claim 5, wherein for the individual ones of the respective test devices that are configured to communicate using a respective proximity protocol:
transmits a return signal from the other test device to the other bridge device according to the proximity protocol;
converting, by the other bridge device, the return signal into one or more other network protocol messages;
transmitting the one or more other network protocol messages from the other bridge device to the bridge device;
converting, by the bridge device, the one or more other network protocol messages into another return signal;
transmitting the other return signal from the bridge device to the test device according to the proximity protocol; and
wherein the generating results is further based at least on reception of the other return signal at the test device.

14. A system, comprising:
one or more test devices comprising respective processors and memory and configured to communicate using one or more proximity protocols;
one or more bridge devices comprising respective processors and memory and configured to perform one or more of:
convert proximity protocol signals into network protocol messages, or
convert network protocol messages into proximity protocol signals; and
one or more computing devices of a provider network comprising respective processors and memory to implement a remote proximity bridge service to:
receive one or more respective specifications that indicate at least a respective proximity protocol; and
select one or more respective test devices of the plurality of test devices that are configured to communicate using the respective proximity protocols indicated by the respective specifications,
wherein for individual ones of the bridge devices:
the bridge device is configured to receive one or more network protocol messages from a remote bridge device of a remote client network, convert the one or more network protocol messages into a signal, and transmit the signal to one of the respective test devices according to the respective proximity protocol for the test device, wherein the test device and devices of the remote client network are unable to directly communicate using the proximity protocol;
generate results based at least on reception of the signal at the test device; and
transmit the results to an endpoint.

15. The system as recited in claim 14, wherein the one or more respective specifications indicate one or more of software or an operating system to be installed, and wherein the one or more computing devices implement the remote proximity bridge service to:
install on the respective test devices one or more of the software or the operating system indicated by the respective specifications.

16. The system as recited in claim 14, wherein the one or more respective specifications indicate one or more processors, and wherein to select one or more respective test devices, the one or more computing devices implement the remote proximity bridge service to:
determine that the one or more respective test devices comprise the one or more processors indicated by the specification.

17. The system as recited in claim 14, wherein the results are based at least on performance metrics for the reception of the signal at the test device, and wherein to transmit the results to the endpoint, the one or more computing devices implement the remote proximity bridge service to:
transmit the results to the remote client network.

18. The system as recited in claim 14, wherein the one or more respective specifications indicate topology data, and wherein to select one or more respective test devices, the one or more computing devices implement the remote proximity bridge service to:
determine that a topology associated with the one or more respective test devices matches the topology data indicated by the specification.

19. The system as recited in claim 14, wherein for the individual ones of the bridge devices:
the test device is configured to transmit a return signal to the bridge device according to the respective proximity protocol; and
the bridge device is configured to convert the return signal into one or more other network protocol messages and transmit the one or more other network protocol messages to the remote bridge device of the remote client network.

20. The system as recited in claim 14, wherein for other ones of the bridge devices:
the bridge device is configured to generate an emulated signal according to a proximity protocol, convert the emulated signal into one or more network protocol messages, and transmit the one or more network protocol messages to the remote bridge device.

\* \* \* \* \*